(12) United States Patent
Kim et al.

(10) Patent No.: US 10,149,235 B2
(45) Date of Patent: Dec. 4, 2018

(54) DISCOVERY SIGNAL TRANSMISSION/RECEPTION METHOD AND APPARATUS FOR USE IN MOBILE COMMUNICATION SYSTEM

(71) Applicant: Samsung Electronics Co., Ltd., Suwon-si, Gyeonggi-do (KR)

(72) Inventors: Youngbum Kim, Seoul (KR); Joonyoung Cho, Suwon-si (KR); Yongjun Kwak, Yongin-si (KR); Juho Lee, Suwon-si (KR); Hyojin Lee, Suwon-si (KR); Hyoungju Ji, Seoul (KR); Younsun Kim, Seongnam-si (KR); Sangmin Ro, Seoul (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/818,078

(22) Filed: Nov. 20, 2017

(65) Prior Publication Data
US 2018/0077635 A1    Mar. 15, 2018

Related U.S. Application Data

(63) Continuation of application No. 15/383,404, filed on Dec. 19, 2016, now Pat. No. 9,826,471, which is a (Continued)

(30) Foreign Application Priority Data

Dec. 14, 2012 (KR) .................. 10-2012-0146378

(51) Int. Cl.
*H04W 48/16* (2009.01)
*H04W 24/10* (2009.01)

(52) U.S. Cl.
CPC .......... *H04W 48/16* (2013.01); *H04W 24/10* (2013.01); *Y02D 70/00* (2018.01); *Y02D 70/1244* (2018.01);
(Continued)

(58) Field of Classification Search
CPC ..... H04W 24/10; H04W 48/16; H04W 8/005; H04W 52/24; H04W 52/244;
(Continued)

(56) References Cited

U.S. PATENT DOCUMENTS 6,982,971 B2   1/2006  Tiedemann, Jr. et al.
8,200,288 B2   6/2012  Oh
(Continued)

FOREIGN PATENT DOCUMENTS

CN    101442578 A    5/2009
CN    101473677 A    7/2009
(Continued)

*Primary Examiner* — Meless N Zewdu
(74) *Attorney, Agent, or Firm* — Jefferson IP Law, LLP

(57) ABSTRACT

A discovery signal transmission/reception method and an apparatus for improving energy efficiency of the system are provided. The discovery signal transmission method of a base station in a mobile communication system according to the present disclosure includes acquiring a discovery signal configuration of a neighbor cell, transmitting the discovery signal configuration to a terminal, receiving a measurement report including a result of measurement on a discovery signal of the neighbor from the terminal, the measurement being performed based on the discovery signal configuration, and determining whether to make a handover decision for the terminal based on the measurement report. The discovery signal transmission/reception method of the present disclosure is advantageous in improving energy efficiency of a mobile communication system.

22 Claims, 14 Drawing Sheets

Related U.S. Application Data continuation of application No. 14/105,873, filed on Dec. 13, 2013, now Pat. No. 9,526,064.

(52) U.S. Cl.
CPC ...... *Y02D 70/1246* (2018.01); *Y02D 70/1262* (2018.01); *Y02D 70/1264* (2018.01); *Y02D 70/146* (2018.01)

(58) Field of Classification Search
CPC ... H04W 40/24; H04W 40/244; H04W 88/00; H04W 88/02; H04W 4/02; H04W 88/08; H04W 92/10; H04W 84/045; H04W 4/023; H04W 36/0083; H04W 40/02; H04W 40/22; H04W 40/246; H04W 40/08; H04W 40/10; H04W 40/18; H04W 40/005; H04W 52/00; H04W 52/02; H04W 36/0061; H04W 36/0066; Y02D 70/00; Y02D 70/1262; Y02D 70/146; Y02D 70/1246; Y02D 70/1244; Y02D 70/1264
See application file for complete search history.

(56) References Cited

U.S. PATENT DOCUMENTS

| | | | | |
|---|---|---|---|---|
| 8,989,757 | B2* | 3/2015 | Barta | H04W 24/02 455/452.1 |
| 9,118,528 | B2* | 8/2015 | Sorrells | H03C 1/62 |
| 9,319,914 | B2* | 4/2016 | Narasimha | H04W 24/10 |
| 9,526,064 | B2* | 12/2016 | Kim | H04W 24/10 |
| 9,826,471 | B2* | 11/2017 | Kim | H04W 48/16 |
| 2004/0100935 | A1 | 5/2004 | Papageorgiou et al. | |
| 2005/0272403 | A1 | 12/2005 | Ryu et al. | |
| 2006/0040699 | A1 | 2/2006 | Kim et al. | |
| 2007/0293224 | A1 | 12/2007 | Wang et al. | |
| 2008/0188215 | A1 | 8/2008 | Bergstrom et al. | |
| 2009/0137277 | A1 | 5/2009 | Oh | |
| 2009/0156225 | A1 | 6/2009 | Angelow et al. | |
| 2009/0316659 | A1 | 12/2009 | Lindoff et al. | |
| 2010/0284303 | A1 | 11/2010 | Catovic et al. | |
| 2010/0317343 | A1 | 12/2010 | Krishnamurthy et al. | |
| 2011/0014921 | A1 | 1/2011 | Neil | |
| 2011/0065431 | A1* | 3/2011 | Neil | H04W 48/16 455/434 |
| 2011/0116481 | A1 | 5/2011 | Wang | |
| 2011/0171915 | A1 | 7/2011 | Gomes et al. | |
| 2011/0299502 | A1 | 12/2011 | Jung et al. | |
| 2011/0306340 | A1 | 12/2011 | Lindoff et al. | |
| 2011/0319086 | A1 | 12/2011 | Katori | |
| 2012/0028676 | A1 | 2/2012 | He | |
| 2012/0120842 | A1* | 5/2012 | Kim | H04B 7/024 370/252 |
| 2012/0231790 | A1 | 9/2012 | Lindoff et al. | |
| 2012/0252432 | A1* | 10/2012 | Henttonen | H04W 24/10 455/422.1 |
| 2012/0257515 | A1 | 10/2012 | Hugl et al. | |
| 2013/0053091 | A1 | 2/2013 | Jorguseski et al. | |
| 2013/0070625 | A1* | 3/2013 | Fujishima | H04W 36/20 370/252 |
| 2013/0252660 | A1* | 9/2013 | Bach | H04W 52/0206 455/525 |
| 2013/0273878 | A1* | 10/2013 | Heo | H04W 28/02 455/405 |
| 2013/0288658 | A1 | 10/2013 | Duan et al. | |
| 2014/0056220 | A1 | 2/2014 | Poitau et al. | |
| 2015/0003348 | A1 | 1/2015 | Ishii et al. | |

FOREIGN PATENT DOCUMENTS

| | | |
|---|---|---|
| CN | 101536585 A | 9/2009 |
| CN | 102084699 A | 6/2011 |
| WO | 2007/149509 A2 | 12/2007 |

* cited by examiner

FIG. 3
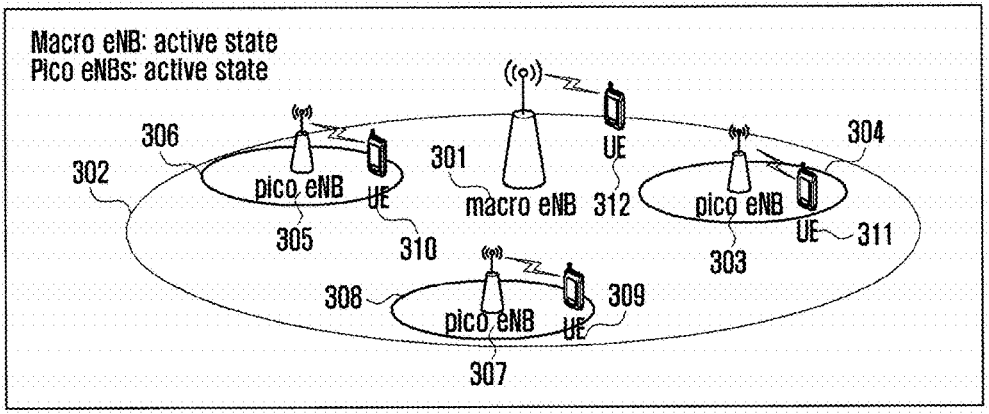
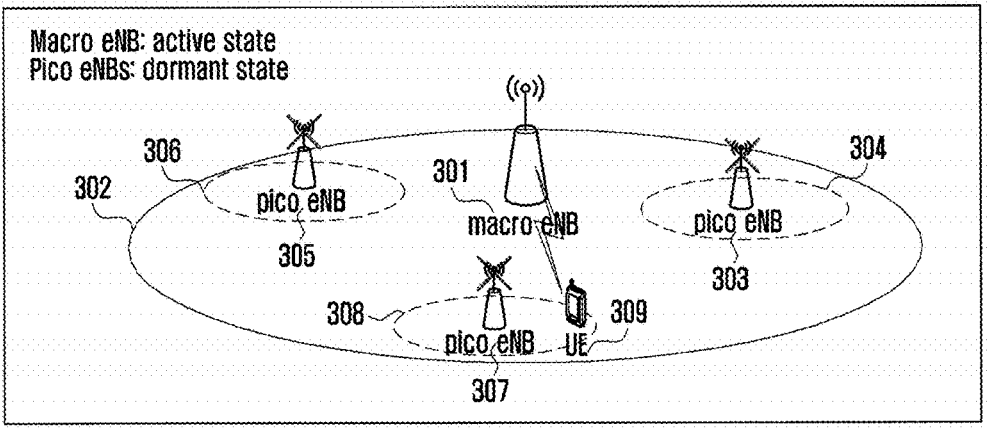

DISCOVERY SIGNAL TRANSMISSION/RECEPTION METHOD AND APPARATUS FOR USE IN MOBILE COMMUNICATION SYSTEM

CROSS-REFERENCE TO RELATED APPLICATION(S)

This application is a continuation application of prior application Ser. No. 15/383,404, filed on Dec. 19, 2016 which is a continuation application of prior application Ser. No. 14/105,873, filed on Dec. 13, 2013 which has issued as U.S. Pat. No. 9,526,064 on Dec. 20, 2016 and claimed the benefit under 35 U.S.C. § 119(a) of a Korean patent application filed on Dec. 14, 2012 in the Korean Intellectual Property Office and assigned Serial number 10-2012-0146378, the entire disclosure of which is hereby incorporated by reference.

TECHNICAL FIELD

The present disclosure relates to a cellular radio communication system. More particularly, the present disclosure relates to a discovery signal transmission/reception method and apparatus for improving energy efficiency of the system in such a way that the terminal performs cell search with a discovery signal, acquires time/frequency synchronization of the corresponding cell, and operating the cell in an active state or a dormant state.

BACKGROUND

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in 3' Generation Partnership Project (3GPP), High Rate Packet Data (HRPD) defined in 3' Generation Partnership Project-2 (3GPP2), and Institute of Electrical and Electronic Engineers (IEEE) 802.16, have been developed to support the high-speed, high-quality wireless packet data communication services. Particularly, LTE is a communication standard developed to support high speed packet data transmission and to maximize the throughput of the radio communication system with various radio access technologies. LTE-A is the evolved version of LTE to improve the data transmission capability.

As one of the broadband mobile communication systems, the LTE system adopts Orthogonal Frequency Division Multiplexing (OFDM) scheme in the downlink and Single Carrier Frequency Division Multiple Access (SC-FDMA) in the uplink. Such multiple access schemes allocate and manage the time-frequency resources for transmitting user-specific data or control information without overlap, i.e. maintaining orthogonality, so as to differentiate user-specific data and control informations.

FIG. 1 is a diagram illustrating a structure of the radio resource in downlink of the LTE and LTE-A system according to the related art.

FIG. 1 shows the basic structure of time-frequency grid of radio resource mapping relationship between the downlink physical channel and signals for transmitting data and control channels in the downlink of an LTE/LTE-A system.

Referring to FIG. 1, the horizontal axis denotes time, and the vertical axis denotes frequency. The smallest unit of transmission in time domain is OFDM symbol 104, and a slot 101 consists of NsymbDL OFDM symbols (typically, NsymbDL=7). A subframe 102 spans 1 ms and consists of two 0.5 ms slots, and a radio frame 103 spans 10 ms and consists of 20 slots, i.e. 10 subframes. The smallest unit of transmission in frequency domain is subcarrier 105, and the entire system bandwidth 109 consists of total NBW subcarriers. Here, NBW is in proportion to the system bandwidth. In the time-frequency grid, Resource Element (RE) 106 is the basic unit indicated by OFDM symbol index and subcarrier index. The Resource Block (RB) or Physical Resource Block (PRB) 108 consists of NsymbDL consecutive OFDM symbols in the time domain and NscRB consecutive subcarriers (Typically NscRB=12) in the frequency domain. Accordingly, one RB consists of NsymbDL× NscRB REs. Typically, an RB is the smallest unit of resource that can be allocated to a user.

The downlink control channels are transmitted in the first N OFDM symbols at the beginning of a subframe. Typically, N={1, 2, 3}. N varies depending on the amount of the control information sent at every subframe. The control channels 110 include Physical Control Format Indicator Channel (PCFICH) carrying an indicator indicating the value N, Physical Downlink Control Channel (PDCCH) carrying uplink or downlink scheduling information, and Physical Hybrid Automatic Repeat reQuest (HARQ) Indicator Channel (PHICH) carrying HARQ ACKnowledgement (ACK)/Non-ACKnowledgement (NACK). The Physical Downlink Shared Channel (PDSCH) 111 is transmitted at the region where no downlink control channels are mapped.

An evolved Node B (eNB) transmits Reference Signal (RS) for use in downlink channel state measurement or PDSCH decoding at a User Equipment (UE). The RS is a pilot signal. The RS may be categorized into one of Cell-specific Reference Signal (CRS) 112 which all UEs can receive within the cell, Channel Status Information Reference Signal (CSI-RS) 114 transmitted on different antenna ports using a smaller amount of resource as compared to CRS, and DeModulation Reference Signal (DM-RS) 113 referenced to decode PDSCH scheduled to a predetermined UE.

The CSI-RS is defined per antenna port for use in measuring channel status of each antenna port. If the same CSI-RS is transmitted through multiple physical antennas, the UE cannot discriminate among the physical antennas but recognizes a single antenna port.

The eNB may transmit CSI-RS at cell-specific positions. The reason for assigning the time and frequency resources at cell specific positions is to prevent inter-cell interference of CSI-RS.

In the LTE/LTE-A system, in order for the UE to acquire cell ID and subframe and radio frame synchronization and frequency synchronization, the eNB transmits Primary Synchronization Signal (PSS) and Secondary Synchronization Signal (SSS). The eNB uses predetermined sequences for the respective PSS and SSS which are repeatedly transmitted at predetermined positions in a radio frame.

FIG. 2 is a diagram illustrating the positions of PSS and SSS in a radio frame of LTE/LTE-A Frequency Division Duplex (FDD) system according to the related art.

Referring to FIG. 2, the PSS is transmitted at OFDM symbol#6 201 and 203 of subframe#0 and subframe#5 in the time domain. Meanwhile, the SSS is transmitted at OFDM symbol#5 202 and 204 of subframe#0 and subframe#5. In the frequency domain, the PSS and SSS are mapped to 6 RBs 205 of the system bandwidth.

The UE uses PSS and SSS for tracking the time and frequency of the corresponding cell continuously and detects and measures PSS and SSS of neighboring cells as preparation for handover to any neighboring cell.

Recently, there are many discussions on how to reduce system overhead to improve energy efficiency of LTE/LTE-A system. Such discussions include minimizing downlink control channel transmission and reducing transmission interval of CRS in the time-frequency domain.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for improving energy efficiency of the system in such a way that the terminal performs cell search with a discovery signal, acquires time/frequency synchronization of the corresponding cell, and operating the cell in an active state or a dormant state.

In accordance with an aspect of the present disclosure, a discovery signal transmission method of a base station in a mobile communication system is provided. The discovery signal transmission method includes identifying a discovery signal configuration of a neighbor cell, transmitting the discovery signal configuration to a terminal, and receiving a measurement report including a result of measurement on a discovery signal of the neighbor from the terminal, the measurement being performed based on the discovery signal configuration.

In accordance with another aspect of the present disclosure, a discovery signal reception method of a terminal in a mobile communication system is provided. The discovery signal reception method includes receiving a discovery signal configuration of a neighbor cell from a base station, measuring a discovery signal of the neighbor cell based on the discovery signal configuration, and reporting a measurement result on the discovery signal.

In accordance with another aspect of the present disclosure, a discovery signal transmission method of a base station of a wireless mobile communication system is provided. The discovery signal transmission method includes identifying a discovery signal configuration of the base station and transmitting a discovery signal according to the discovery signal configuration, wherein the discovery signal configuration comprises at least one of discovery signal transmission interval, transmission timing, bandwidth, resource mapping information, sequence information, and timing information.

In accordance with another aspect of the present disclosure, a base station of a mobile communication system is provided. The base station includes a transceiver configured to communicate with other base stations and a terminal, and a controller configured to control the transceiver to acquire a discovery signal configuration of a neighbor cell, transmit the discovery signal configuration to a terminal, and receive a measurement report including a result of measurement on a discovery signal of the neighbor from the terminal, the measurement being performed based on the discovery signal configuration.

In accordance with another aspect of the present disclosure, a terminal of a mobile communication system is provided. The terminal includes a transceiver which configured to communicate with a base station and a controller which controls the transceiver to receive a discovery signal configuration of a neighbor cell from a base station, measure a discovery signal of the neighbor cell based on the discovery signal configuration, and report a measurement result on the discovery signal.

In accordance with another aspect of the present disclosure, a base station of a wireless mobile communication system is provided. The base station includes a transceiver configured to communicate with other base stations and terminals, and a controller configured to identify a discovery signal configuration of the base station and to control the transceiver to transmits a discovery signal according to the discovery signal configuration, wherein the discovery signal configuration comprises at least one of discovery signal transmission interval, transmission timing, bandwidth, resource mapping information, sequence information, and timing information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram illustrating exemplary cases of system operations according to an embodiment of the present disclosure;

Throughout the drawings, it should be noted that like reference numbers are used to depict the same or similar elements, features, and structures.

DETAILED DESCRIPTION

Figure 1:
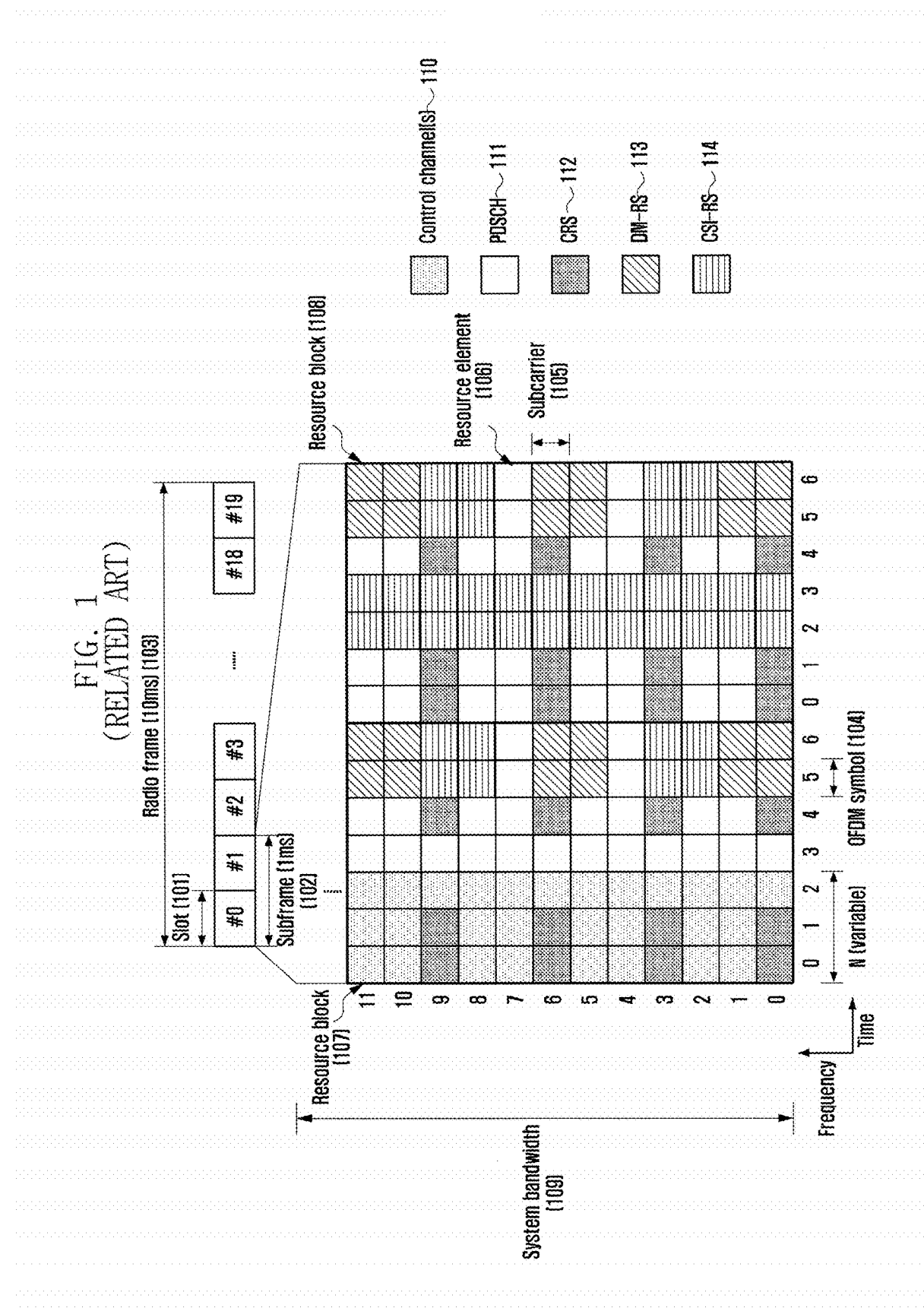
FIG. 1 is a diagram illustrating a structure of a radio resource in downlink of a Long Term Evolution (LTE) and LTE-Advanced (LTE-A) system according to the related art.
Figure 2:
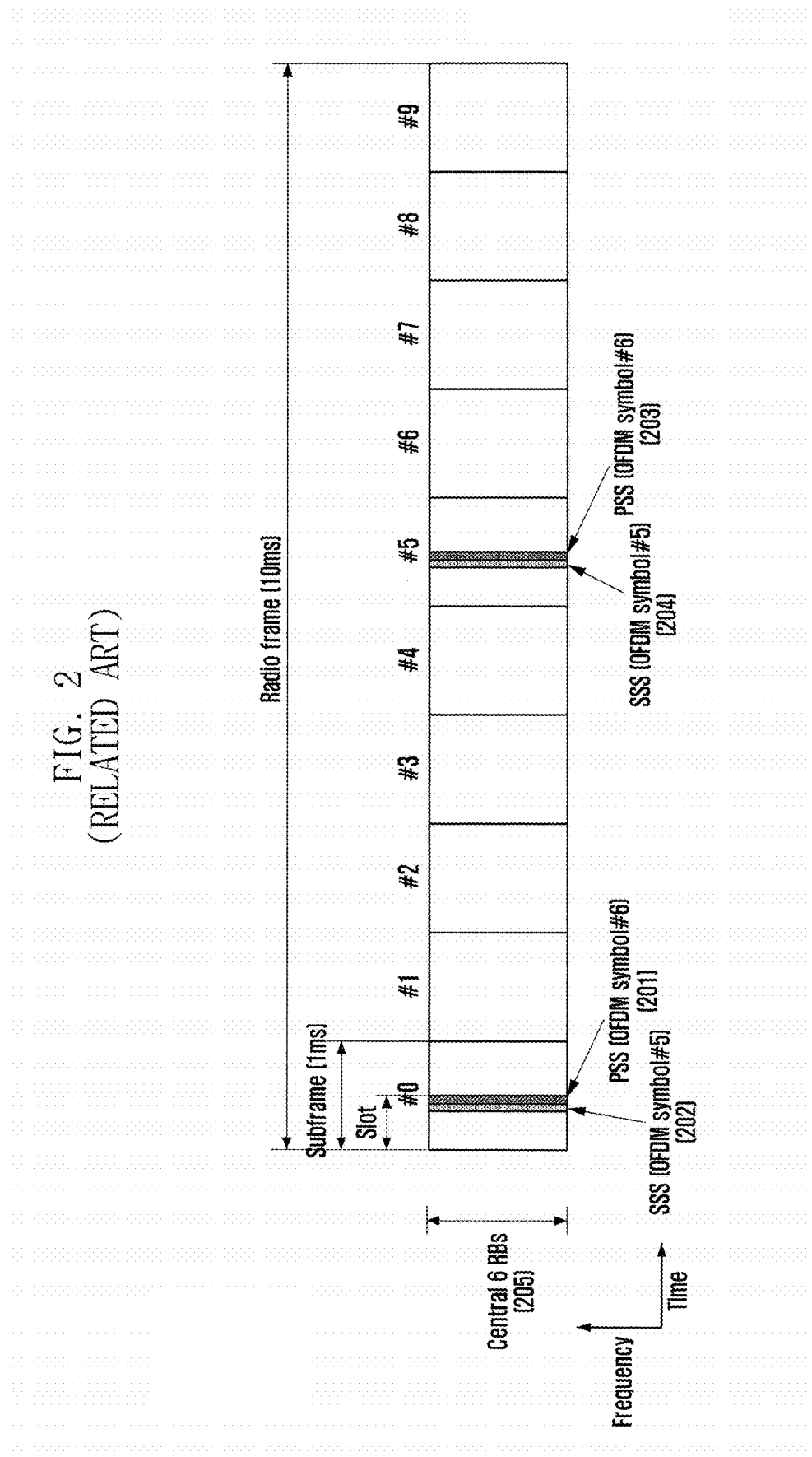
FIG. 2 is a diagram illustrating positions of Primary Synchronization Signal (PSS) and Secondary Synchronization Signal (SSS) in a radio frame of LTE/LTE-A system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the base station is an entity of allocating resources to a User Equipment (UE) and often referred to an evolved Node (eNode) B, a eNB, a Node B, a Base Station (BS), a radio access unit, a base station controller, or a network node.

In the present disclosure, the terminal may be referred to as a UE, a Mobile Station (MS), a cellular phone, a smartphone, a computer, and a multimedia system equipped with a communication function.

In the present disclosure, the term 'UpLink (UL)' denotes the radio link for transmitting data and/or control signal from the terminal to the base station, and the term 'DownLink (DL)' denotes the radio link for transmitting data and/or control signal from the base station to the terminal.

The present disclosure can be applied to other communication systems having the similar technical background and channel formats. Also, it will be understood by those skilled in the art that the present disclosure can be applied to other communication systems with a slight modification without departing from the spirit and scope of the present disclosure. For example, a transmission method according to an embodiment of the present disclosure may be applied to High Speed Packet Access (HSPA) system.

Various embodiments of the present disclosure are described with reference to the accompanying drawings in detail. The same reference numbers are used throughout the drawings to refer to the same or like parts. Detailed description of well-known functions and structures incorporated herein may be omitted to avoid obscuring the subject matter of the present disclosure.

FIG. 3 is a diagram illustrating exemplary cases of system operations according to an embodiment of the present disclosure.

Referring to FIG. 3, a plurality of pico eNBs 303, 305, and 307 having relatively small coverage areas 304, 306, and 308 are deployed within the coverage area 302 of the macro eNB 301. Here, the macro and pico eNBs may operate on the same or different frequencies.

Typically, the macro eNB transits signals at relatively high transmit power and has large coverage as compared to the pico eNB.

Typically, the shorter the propagation path, the less attenuation of the signal transmitted by the UE or eNB experiences. Accordingly, when the signal propagation path is short, it is possible to provide high speed data service at relatively low transmission power level and with low interference probability. When it is necessary to distribute the data traffic of several UEs within the coverage area of the macro eNB to the pico eNBs (Case A), the closest eNB (pico or macro eNB) serves the corresponding UE, resulting in improvement of entire system throughput. That is, the UE 312 is served by the macro eNB 301, the UE 309 by the pico eNB 307, the UE 310 by the pico eNB 305, and the UE 311 by the pico eNB 303.

If it is not necessary to distribute data traffic due to sparse UEs (Case B), the pico eNBs 303, 305, and 307 enter the dormant state while the macro eNB operates in the active state to improve the energy efficiency of the system. Referring to FIG. 3, since the macro eNB 301 has relatively large coverage area, it stays in the active state as far as possible to support UE mobility. That is, the UE 309 is served by the macro eNB 301.

In the dormant state, the respective pico eNB suspends transmission/reception of common data channel, control channel, and RS and transmits a discovery signal for UEs sporadically. This is advantageous in reduction of energy consumption of the pico eNB. In the active state, the pico eNB maintains transmission/reception of the common data channel, control channel, and RS.

Case A is directed to the situation where all pico eNBs 303, 305, and 307 are in the active state, and Case B is directed to the situation where all or some of the pico eNBs 303, 305, and 307 are in the dormant state.

In Case B, if a plurality of UEs request for being served within the coverage area of the macro eNB, it is necessary to transition the situation to Case A. For this purpose, the UE has to discover the pico eNBs 303, 305, and 307 operating in the dormant state and notify the macro eNB of this to transitions the operation state of the pico eNBs 303, 305, and 307 to the active state.

Figure 4:
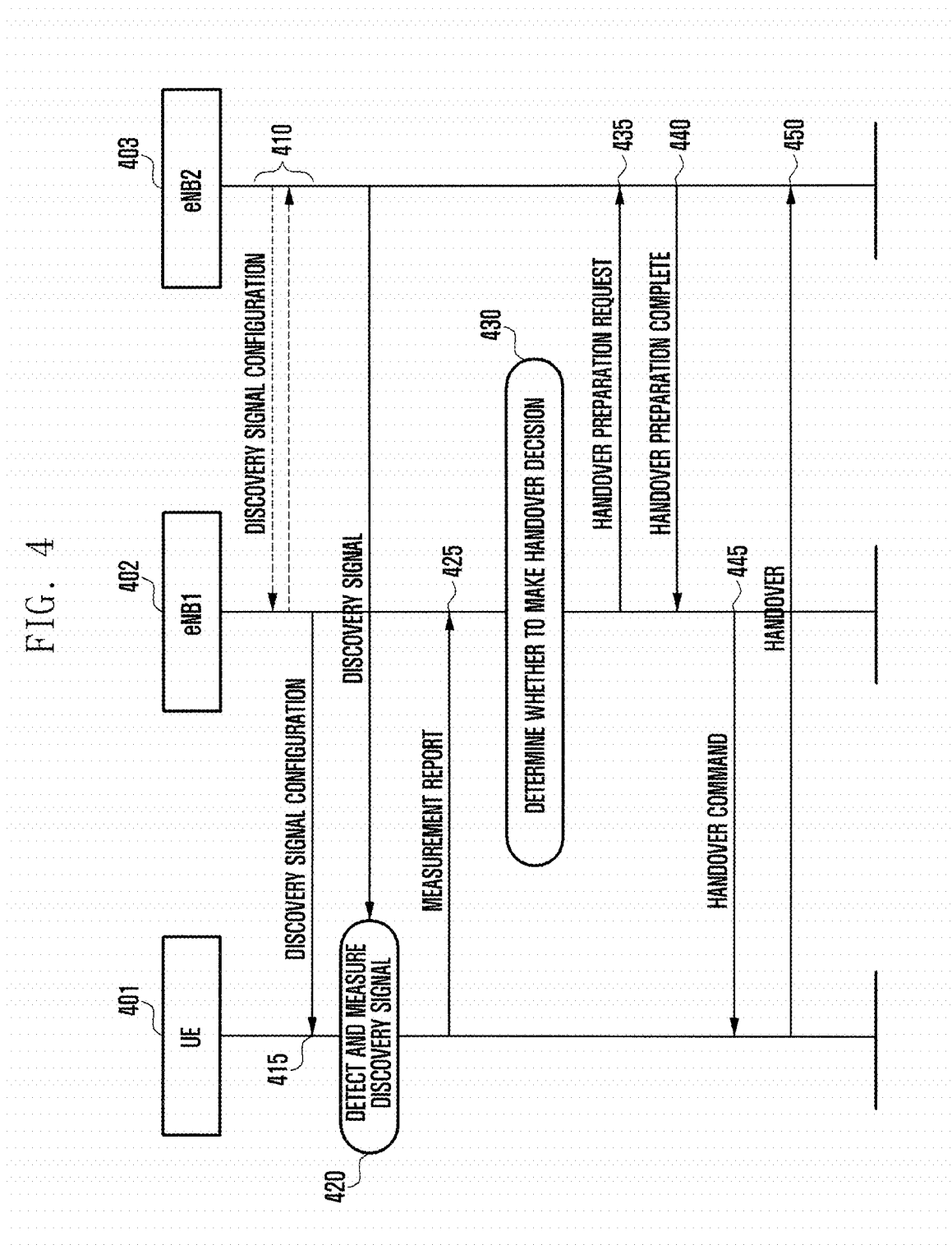
FIG. 4 is a signal flow diagram illustrating signal flows between User Equipment (UE) and evolved Node Bs (eNBs) according to an embodiment of the present disclosure.

FIG. 4 is a signal flow diagram illustrating signal flows between the UE and eNBs according to an embodiment of the present disclosure.

Referring to FIG. 4, a procedure in which the UE receives a discovery signal from the eNB and makes a handover to the corresponding eNB is illustrated. It is assumed that the UE 401 is served by the serving eNB 1 402 and the eNB 2 403 transmits the discovery signal as a neighbor cell of the eNB 1 402 to support the UE's cell search.

The eNB 1 402 identifies the discovery signal of the second eNB 2 403 at operation 410. The eNB 1 402 is capable of setting the discovery signal configuration of the eNB 2 403 and acquiring the set discovery signal configuration of the eNB 2 403. In this case, the eNB 1 402 may transmit the set discovery signal to the eNB 2 403. The eNB 1 402 also may receive the discovery signal configuration of the eNB 2 403 from the eNB 2 403 and identify the discovery signal. Here, the discovery signal configuration may include discovery signal transmission interval, transmission timing, bandwidth, resource mapping information, sequence information, etc. Next, the eNB 1 402 forwards the discovery signal configuration of the second eNB 403 to the UE 401 at operation 415. At this time, the eNB 1 402 may send the discovery signal configuration information of other eNBs as well as eNB 2 403.

The UE 401 receives the discovery signal transmitted by the eNB 2 403 using the acquired discovery signal configuration at operation 420. The UE acquires subframe/radio frame synchronization and cell ID of the eNB 2 (or cell) 403 from the received discovery signal. The UE 401 also measures the signal strength of the received discovery signal. Although the description is directed to the case where the UE 401 receives the discovery signal of the eNB 2 403, it may receive the discover signal transmitted by another eNB using the discovery signal configuration of the corresponding eNB.

Afterward, the UE 401 sends the eNB 1 402 a measurement report including discovery signal detection and measurement result at operation 425. The measurement report may include cell ID(s) and received signal strength of the one or more discovery signals. In order to reduce unnecessary transmission overhead of the UE, the UE transmits only the measurement report on the discovery signals if the received signal strength is greater than a predetermined threshold value. The threshold value may be included in the discovery signal configuration transmitted from the eNB 1 402 to the UE 401 or may be a fixed value.

The eNB 1 402 determines whether to make a handover decision on the UE 401 to the eNB 2 403 based on the measurement report from the UE 401 at operation 430. If the measurement report includes the cell ID of the eNB 2 403 at operation 430 and if the receives signal strength is strong enough, the eNB 1 402 sends the eNB 2 403 a handover preparation request message for handover of the UE 401 to the eNB 2 403 at operation 435.

Next, the eNB 1 402 receives a handover preparation complete message from the eNB 2 403 in response to the handover preparation request at operation 440 and sends the UE 401 a handover command at operation 445.

Upon receipt of the handover command from the eNB 1 402, the UE 401 performs handover to the eNB 2 403 according to the handover command at operation 450.

In the procedure of FIG. 4, the eNB 1 402 is a macro eNB and the eNB 2 403 is a pico eNB.

Figure 5:
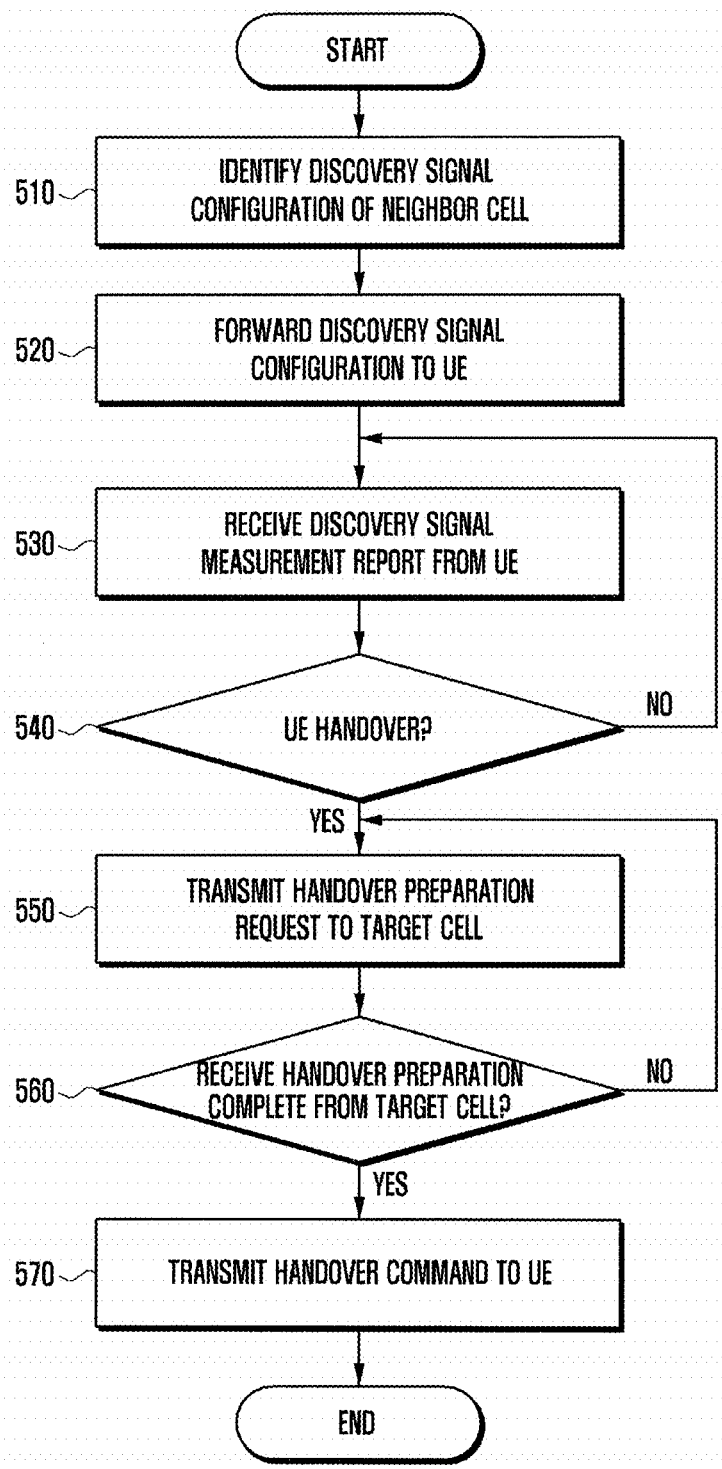
FIG. 5 is a flowchart illustrating an eNB procedure according to an embodiment of the present disclosure.

FIG. 5 is a flowchart illustrating the eNB procedure according to an embodiment of the present disclosure.

FIG. 5 is a flowchart illustrating the eNB procedure according to an embodiment of the present disclosure.

Referring to FIG. 5, the eNB acquires the discovery signal configuration of the neighbor cell at operation 510 and notifies the UE of the discovery signal configuration of the neighbor cell at operation 520. As described above, the discovery signal configuration may include the discovery signal transmission interval, transmission timing, bandwidth, resource mapping information, sequence information, etc., and the eNB may acquire the discovery signal configurations of one or more neighbor cells and notify the UE of the acquired discover signal configurations.

Afterward, the eNB receives the measurement report including information on the cell ID and received signal strength corresponding to one or more discovery signals from the UE at operation 530. In this case, the measurement report may include information on only the discovery signals if the received signal strength is greater than the threshold value to reduce unnecessary transmission overhead of the UE, and the threshold value may be included in the discovery signal configuration information at operation 520 or may be a fixed value.

The eNB determines whether to make a handover decision for the UE based on the received measurement report at operation 540. If the measurement report includes the cell ID of the neighbor eNB and if the received signal strength is strong enough, the eNB makes a handover decision for the UE.

If it is determined to make no handover decision for the UE at operation 540, the eNB returns the procedure to operation 530 to receive next measurement report from the UE. If it is determined to make a handover decision for the UE at operation 540, the eNB sends a handover target cell a handover preparation request message at operation 550. If a handover preparation complete message is received from the target cell at operation 560, the eNB commands the UE to make a handover to the target cell at operation 570. If no handover preparation complete message is received at operation 560, the eNB returns the procedure to operation 550.

Figure 6:
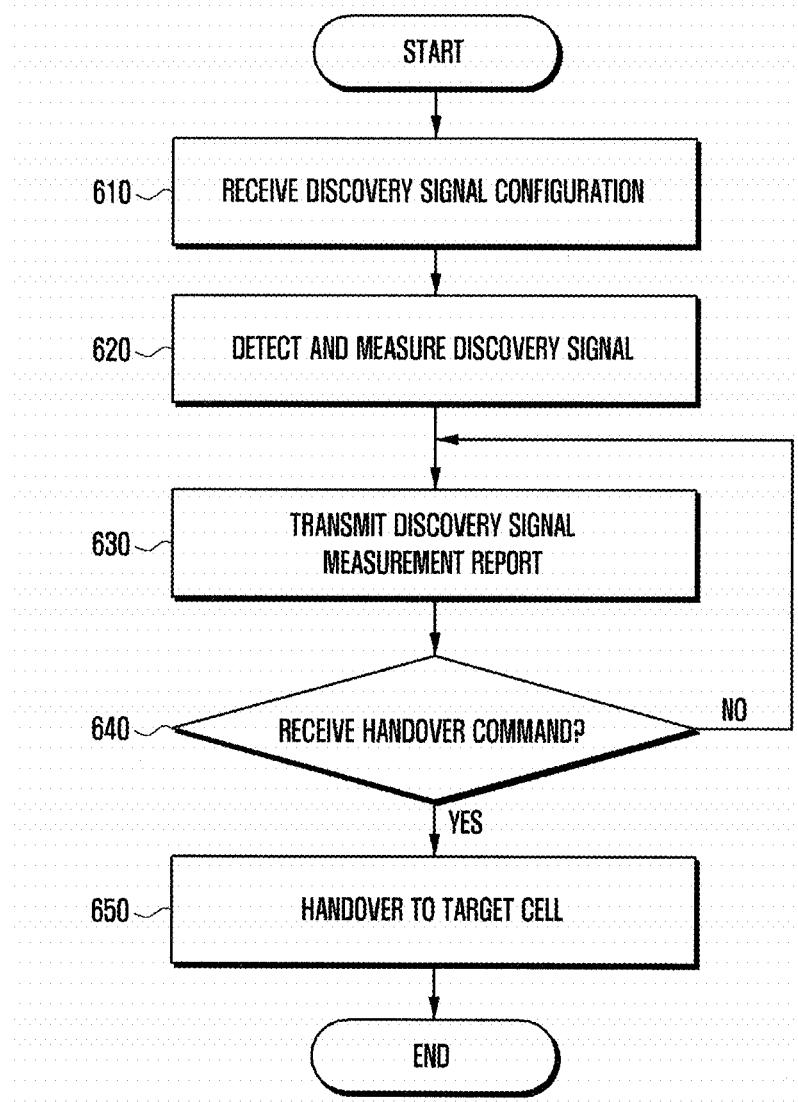
FIG. 6 is a flowchart illustrating a UE procedure according to an embodiment of the present disclosure.

FIG. 6 is a flowchart illustrating the UE procedure according to an embodiment of the present disclosure.

Referring to FIG. 6, the UE acquires the discovery signal configuration of a neighbor cell from the eNB at operation 610. As described above, the discovery signal configuration may include the discovery signal transmission interval, transmission timing, bandwidth, resource mapping information, sequence information, etc. and the UE may receive the discovery signal configuration of one or more cells from the eNB.

The UE detects and measures the discovery cell using the discovery signal configuration of the acquired neighbor cell at operation 620. Next, the UE sends the eNB a measurement report about the measure discovery signal at operation 630. At this time, to reduce unnecessary transmission overhead of the UE, the UE transmits the measurement result on the discovery signals if the strength is greater than a predetermined threshold value. The threshold value may be included in the discovery signal configuration transmitted from the eNB to the UE at operation 610 or may be a fixed value.

Afterward, the UE determines whether a handover command is received from the eNB at operation 640. If no handover command is received at operation 640, the UE returns the procedure to operation 630. If a handover command is received at operation 640, the UE performs handover to the target cell indicated by the handover command at operation 650.

A description is made of the above procedure in more detail with reference to various embodiments hereinafter.

First Embodiment

A description is made of the discovery signal configuration transmitted from the eNB to the UE according to an embodiment of the present disclosure. As described above, the discovery signal configuration includes the discovery signal transmission interval, transmission timing, bandwidth, resource mapping information, sequence information, etc.

The discovery signal may be transmitted at a relatively long interval instead of Primary Synchronization Signal (PSS)/Secondary Synchronization Signal (SSS) transmitted at an interval of a radio frame (10 ms). Accordingly, if no data traffic occurs for the duration without discovery signal transmission, the eNB enters the dormant state to stop transmission/reception operation, resulting in increase of system energy efficiency. Likewise, the UE performs downlink signal reception only for the duration in which the discovery signal is transmitted so as to reduce power consumption.

Although the transmission interval of the discovery signal is longer than the transmission interval of PSS/SSS in the time domain, it is possible for the UE to perform cell search and acquire subframe/radio frame synchronization with extra delay with the discovery signal by mapping the signal to relatively more resources in the frequency domain. That is, it is possible to improve the discovery signal reception performance and minimize the time for the UE to perform cell search and acquire subframe/radio frame synchronization.

If there is no pre-information notice of the discovery signal transmitted at a long interval, the UE has to continue monitoring the downlink signal to detect the discovery signal and, thus, fails to reduce the power consumption of the UE. Thus the eNB notifies the UE of the discovery signal configuration of the neighbor cell such that the UE determine when to start monitoring the discovery signal. The timing information may be configured as described in embodiment 1-1 or 1-2.

Embodiment 1-1

Embodiment 1-1 is directed to a method for configuring the timing information with the transmission interval and timing offset of the discovery signal. The discovery signal transmission interval is identical with the radio frame period (10 ms). The timing offset is the relative timing for transmitting the discovery signal in the serving cell of the UE. For example, the UE attempts detecting the discovery signal at the time fulfilling Equation (1):

$$\text{SFN mod transmission period} = \text{timing offset} \quad \text{Equation (1)}$$

The System Frame Number (SFN) is the SFN of the cell to which the UE is connected to and a counts the radio frame in the range from 0 to 1023 and repeats at every interval of 1024 radio frames. The timing information may be configured as follows.

Transmission interval={1, 2, 4, 8, 16, 32, 64, 128, ... }
Timing offset={0, 1, 2, 3, ... }

If the eNB has notified the UE of the timing information on the discovery signal of the neighbor cell which includes the transmission interval=64 (i.e. 640 ms) and the timing offset=2, the UE starts monitoring the neighbor cell discovery signal at the timing corresponding to SFN=2, 66, 130, 194, 258, 322, 386, ... as the SNF of the current cell that fulfils the relationship of SFN mod 64=2. In the case that multiple neighbor cells transmit their discovery signals at different timings, the eNB may transmit the discovery signal transmission timing informations on the respective cells to the UE.

Embodiment 1-2

Embodiment 1-2 is directed to a method of notifying whether the neighbor cell has acquired the timing synchronization with the serving cell of the UE. If the neighbor cell and the serving cell have acquired timing synchronization, the UE recognizes that the discovery signal transmission timing of the neighbor cell is identical with that of the serving cell and starts monitoring the discovery signal at the corresponding time. Whether the timing synchronization is acquired between the neighbor and serving cells may be notified using in-bit signal. If this bit may be set to 0 for indicating the timing match between the neighbor and serving cells or 1 for indicating the timing mismatch between the neighbor and serving cells.

In order to facilitate receiving the discovery signal in addition to the timing information, extra signaling may be defined.

First, the eNB notifies the UE capable of receiving both the PSS/SSS and discovery signal of the signals which the UE has to monitor for cell search or subframe/radio frame synchronization. In this way, it is possible to reduce the UE's processing overhead caused by monitoring both the PSS/SSS and discovery signal. The eNB also may instruct the UE to monitor the discovery signal for cell search and PSS/SSS for subframe/radio frame synchronization through this signaling.

Second, it is possible to define the signaling of restricting the number of cell IDs for the UE to monitor. The discovery signal may be defined as a function of cell ID. The current Long Term Evolution (LTE)/LTE-Advanced (LTE-A) system supports total 504 cell IDs, and it is possible to reduce the UE's discovery signal reception processing overhead with the signal of restricting the number of cell IDs which the UE has to monitor.

Second Embodiment

According to above-described embodiment, the UE is capable of acquiring the information on the timings for monitoring the discovery signal from the eNB. This embodiment is directed to a method of acquiring the detailed timing information (e.g. SFN) of the cell transmitting the discovery signal from the discovery signal received by the UE. Since the RACH transmission timing, SRS transmission timing, and Channel State Information Reference Signal (CSI-RS) reception timing of the UE in a certain cell is determined by SFN, the UE has to acquire accurate SFN information.

A description is made of a discovery signal configuration method for the UE to acquire detailed timing information of the cell which has transmitted the discovery signal from the discovery signal. In the following various embodiments, the discovery signal configuration information may be transmitted from the eNB to the UE. The eNB may send the UE the information on the discovery signal configuration information included in or along with the discovery signal configuration. The discovery signal configuration information also may be stored in the UE in advance. At this time, the discovery signal configuration information may be configured by the wireless communication service provider.

Embodiment 2-1

Figure 7:
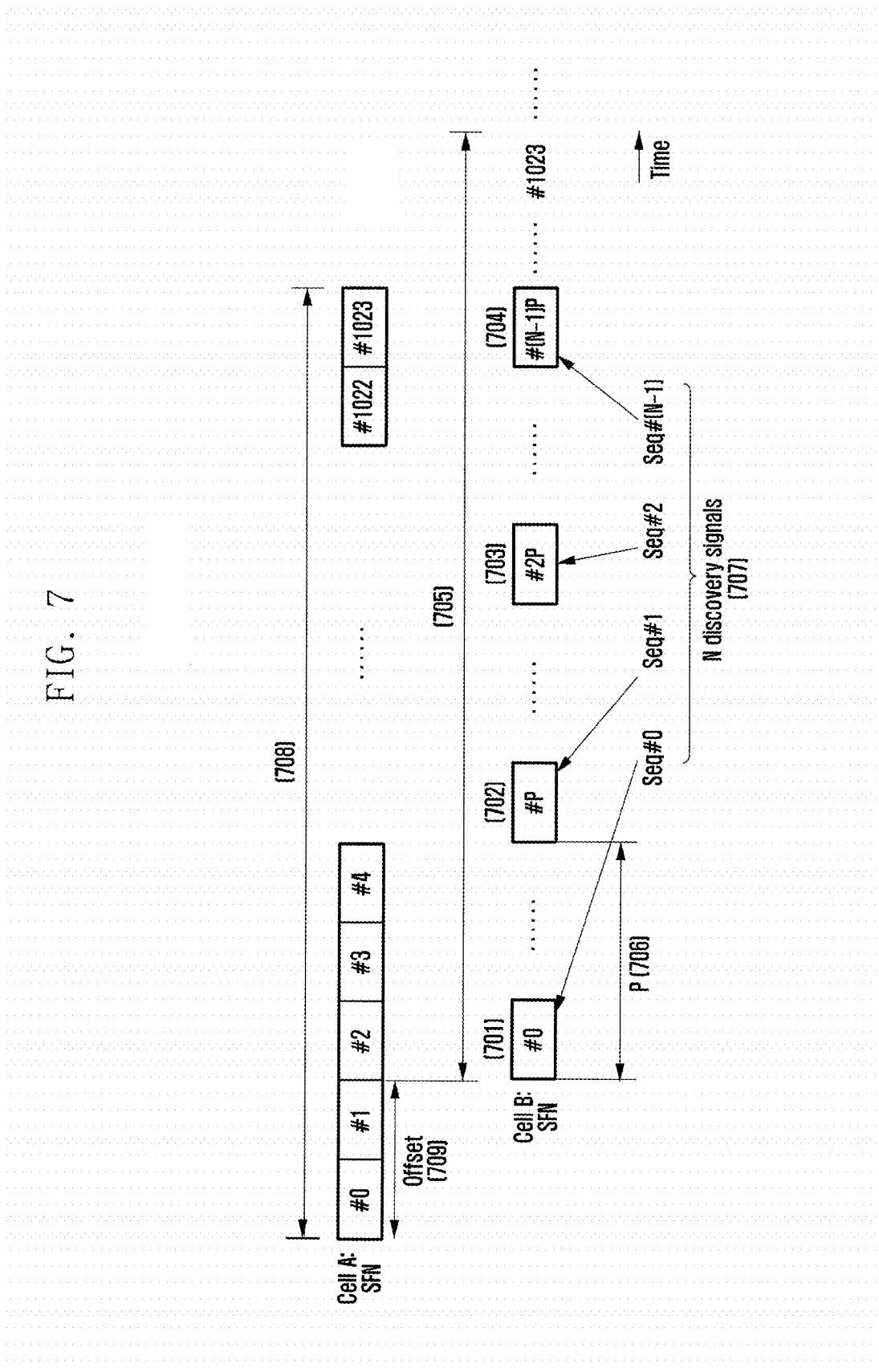
FIG. 7 is a diagram illustrating a configuration of a discovery signal according to an embodiment of the present disclosure.

FIG. 7 is a diagram illustrating a configuration of the discovery signal according to an embodiment of the present disclosure.

Referring to FIG. 7, the eNB which transmits the discovery signal may be configured to transmit total N discovery signal sequences of sequence#0, sequence#1, . . . , sequence#(N−1) at the transmission timings described above at the discovery signal transmission interval P at every 1024 radio frames. At this time, the relationship of N=ceiling (1024/P) is fulfilled. The ceiling (x) denotes the minimum integer which is not less than x.

For example, assuming cell A to which the UE is currently connected, the UE receives the discovery signal from neighbor cell B, the discovery signal transmission period P 706 is 256, and the timing offset 709 to SFN of cell A is 2. The discovery signal transmission timings of cell B may be defined as transmission timings 701, 702, 703, and 704 as described above. If the discovery signal transmission period P is 256, it is possible to define 4 (=celling (1024/256) sequences as sequence#0, sequence#1, sequence#2, and sequence#3 and transmit the corresponding discovery signals at the respective transmission timings 701, 702, 703, and 704.

Referring to FIG. 7, it is assumed that mapping the transmission timing 701 of the sequence#0 of cell B to the SFN#0 of cell B has been provided to the UE. Accordingly, if the sequence#0 as the discovery signal is detected, the UE becomes aware of the SFN#0 of cell B which corresponds to the discovery signal transmission timing 701 of cell B. Likewise, the detection of sequence#1 makes it possible to know the SFN#256 (P=256) of cell B which corresponds to the discovery signal transmission timing 702 of cell B, the detection of sequence#2 makes it possible to know the SFN#512 (2P=512) of cell B which corresponds to the discovery signal transmission timing 703 of cell B, and the detection of sequence#3 makes it possible to know the SFN#768 (3P=768) of cell B which corresponds to the discovery signal transmission timing 704 of cell B.

Embodiment 2-2

Figure 8:
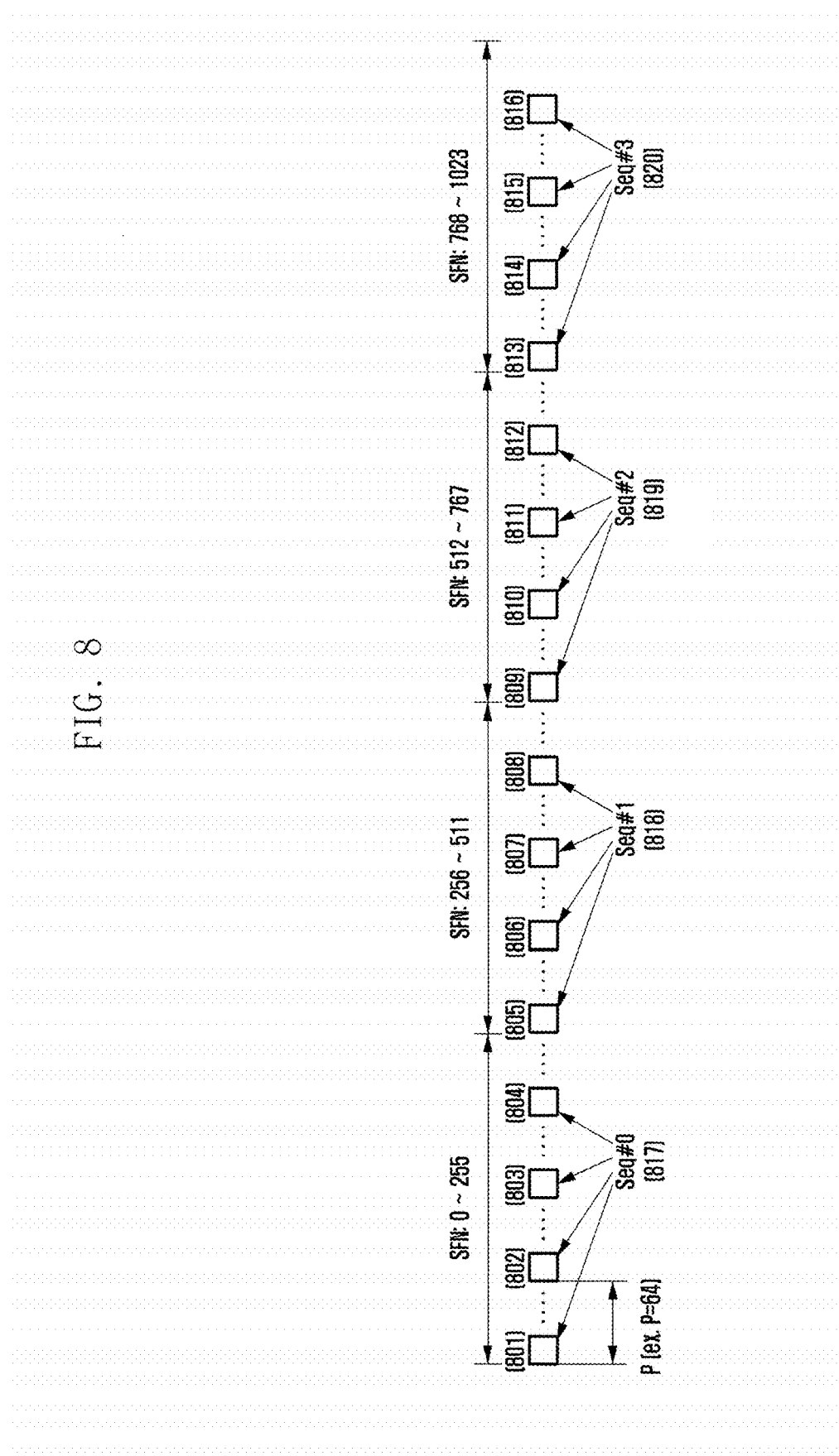
FIG. 8 is a diagram illustrating a configuration of a discovery signal according to an embodiment of the present disclosure.

FIG. 8 is a diagram illustrating a configuration of the discovery signal according to another embodiment of the present disclosure.

Referring to FIG. 8, the discovery signal sequence is mapped to multiple discovery signal transmission timings (1 to N). Assuming the discovery signal transmission period P=64, 16 discovery signals 801 to 816 are transmitted at every 1024 radio frames corresponding to SFN period. In this case, the 16 discovery signals 801 to 816 are sorted into groups of M discovery signals and each group is mapped to unique sequence which is transmitted as a discovery signal.

For example, if M=4, the first M discovery signals are transmitted at the transmission timings 801 to 804 use sequence#0 817, the second M discovery signals at the transmission timings 805 to 808 use sequence#1 818, the third M discovery signals at the transmission timings 809 to 812 use sequence#2 819, and the fourth M discovery signals at transmission timings 813 to 816 use sequence#3 820.

Referring to FIG. 8, it is assumed that mapping the transmission timing 801 of sequence#0 to the SFN#0 of the cell transmitting the discovery signal has been provided to the UE. Accordingly, the detection of sequence#0 makes it possible for the UE to know the SFN of cell B which has transmitted the discovery signal is in the range of 0 to 255, the detection of sequence#1 makes it possible for the UE to know the SFN of cell B which has transmitted the discovery signal is in the range of 256 to 511, the detection of sequence#2 makes it possible for the UE to know the SFN of cell B which has transmitted the discovery signal is in the range of 512 to 767, and the detection of sequence#3 makes it possible for the UE to know the SFN of cell B which has transmitted the discovery signal is in the range of 768 to 1023. At this time, the UE may determine SFN of the cell which has transmitted the discovery signal based on a predetermined SFN range. The UE may determine SFN of the cell which has transmitted the discovery signal through blind detection. In this case, the number of the blind detection of the UE can be reduced to maximum number of 256 compared with the maximum number of 1024 that is the number of the blind detection when the UE does not know the range of the SFN.

This example is useful for the case where the discovery signal transmission interval P is relatively short and the number of sequences as discovery signal is limited.

Embodiment 2-3

The next example is an alternative of Embodiment 2-2 and is capable of transmitting the discovery signals sorted into groups of M discovery signals using a unique sequence as distributed within the SFN period.

Figure 9:
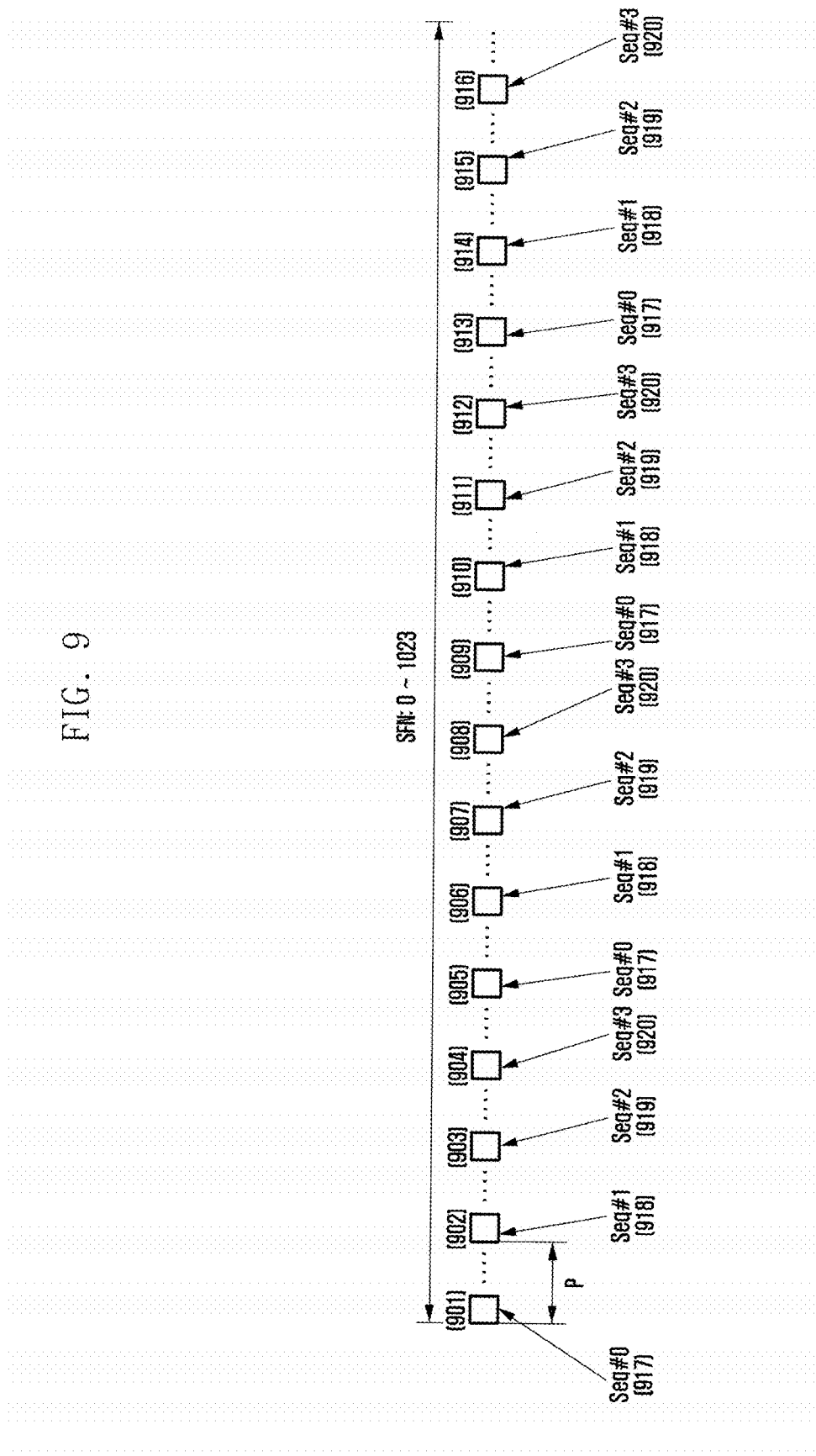
FIG. 9 is a diagram illustrating a configuration of a discovery signal according to an embodiment of the present disclosure.

FIG. 9 is a diagram illustrating a configuration of the discovery signal according to an embodiment of the present disclosure.

Referring to FIG. 9, assuming the discovery signal transmission interval of P=64, the 16 discovery signals 901 to 916 are transmitted at every 1024 radio frames corresponding to SFN period. Here, sequence#0 917, sequence#1 918, sequence#2 919, and sequence#3 920 are mapped to the discovery signal transmission timings 901 to 916 respectively.

Referring to FIG. 9, it is assumed that mapping the transmission timing 901 of the sequence#0 to SFN#0 has been provided to the UE. Accordingly, if the sequence#0 is detected, the UE becomes aware of the SFN of the cell which has transmitted the discovery signal is one of SFN#0, SFN#256, SFN#512, and SFN#768 corresponding to the transmission timings 901, 905, 909, and 913 of sequence#0. At this time, the UE may determine SFN of the cell which has transmitted the discovery signal based on a predetermined SFN range. The UE may determine SFN of the cell which has transmitted the discovery signal through blind detection.

Third Embodiment

The third embodiment is directed to a procedure of transmitting the discovery signal including the state information indicating whether the corresponding cell is in the active state or dormant state.

Embodiment 3-1

The discovery signal sequences are sorted into two groups: one for use in the cell transmitting the discovery signal is in the active state and the other for use in the cell transmitting the discovery signal is in the dormant state. The information on the groups for use in the active and dormant state cells is shared between the eNB and the UE. This information may be provided to the UE in the discovery signal configuration of the neighbor cell which is notified by the eNB.

Embodiment 3-2

The sequence for use in transmitting the discovery signal is generated using the cell ID and state information of the cell transmitting the discovery signal. For example, the discovery signal sequence may be expressed as Equation (2) by applying this embodiment to the sequence for use in legacy PSS. Equation (2) expresses 62-sample length sequence as multiplication of frequency domain Zadoff-Chu sequence as root sequence index u and the cell state information a. The root sequence index u is determined according to the cell ID. The cell state information a may be set to 1 for the cell in the active state or −1 for the cell in the dormant state. Although the length of sequence is expressed by Equation (2) herein, the discovery signal sequence may have different length.

$$d_u(n) = \begin{cases} a \cdot e^{-j\frac{\pi u n(n+1)}{63}} & n = 0, 1, \ldots, 30 \\ a \cdot e^{-j\frac{\pi u(n+1)(n+2)}{63}} & n = 31, 32, \ldots, 61 \end{cases} \quad \text{Equation (2)}$$

Embodiment 3-3

The eNB transmits the discovery signal only when the corresponding cell is in the dormant state but not when the corresponding cell is in the active state. In the special case of embodiment 3-2, cell state information a is set to 0 for the cell in the active state or 1 for the cell in the dormant state. The eNB is capable of conserving the transmit power by suspending transmission of the discovery signal for the cell in the active state. In embodiment 3-1 and embodiment 3-2, however, the eNB transmits the discovery signal regardless of the cell state.

The UE is capable of checking the state of the cell based on the discovery signal generated according to embodiment 3-1, embodiment 3-2, or embodiment 3-3. A description is made of the UE operation after checking the state of the corresponding cell hereinafter.

Fourth Embodiment

If the cell state information of the discovery signal indicates the dormant state, the UE sends the eNB the measurement report including the discovery signal detection and measurement result. However, if the cell state information of the discovery signal indicates the active state, the UE does not send the eNB the discovery signal detection and measurement result. In this way, it is possible to reduce the measurement report overhead of the UE while guaranteeing that the cells included in the measurement report are all in the dormant state. The measurement report includes the cell ID and received signal strength of one or more discovery signals. In order to reduce the unnecessary signaling overhead of the UE, it is possible to include only the measurement result on the discovery signals of which received signal strength is greater than a predetermined threshold value. Since the cells indicated in the discovery signal measurement report are all in the dormant state, the eNB determines whether to activate the cells indicated in the measurement report or to maintain the dormant state of these cells. If it is determined to activate a cell, the eNB determine whether to make a handover decision for the UE to any activated cell.

Fifth Embodiment

The fifth embodiment is directed to a method of transmitting the discovery signal detection and measurement result from the UE to the eNB when the cell state information included in the discovery signal indicates the activate state. In this embodiment, however, if it is determined that the corresponding cell is in the dormant state based on the discovery signal, the UE does not send the eNB the discovery signal detection and measurement result. In this way, it is possible to reduce the measurement report overhead of the UE while guaranteeing that the cells included in the measurement report are all in the active state. The measurement report includes the cell ID and received signal strength of one or more discovery signals. In order to reduce the unnecessary signaling overhead of the UE, it is possible to include only the measurement result on the discovery signals if the received signal strength is greater than a predetermined threshold value. Since the cells indicated in the discovery signal measurement report are all in the activate state, the eNB determines whether to make a handover decision for the UE to any active cell.

Sixth Embodiment

In the sixth embodiment, the UE configures the measurement report regardless of the cell state. The measurement report includes the cell ID, the received signal strength, and the cell state that is acquired based on the discovery signals. The method of the sixth embodiment is useful in the case where the eNB has no information on the cell states of neighbor cells. That is, it is determined that the cell A is in the dormant state and the received signal strength of the signal from the cell A is strong enough based on the measurement report from the UE, the eNB assumes that the cell A is in the active state.

Figure 10:
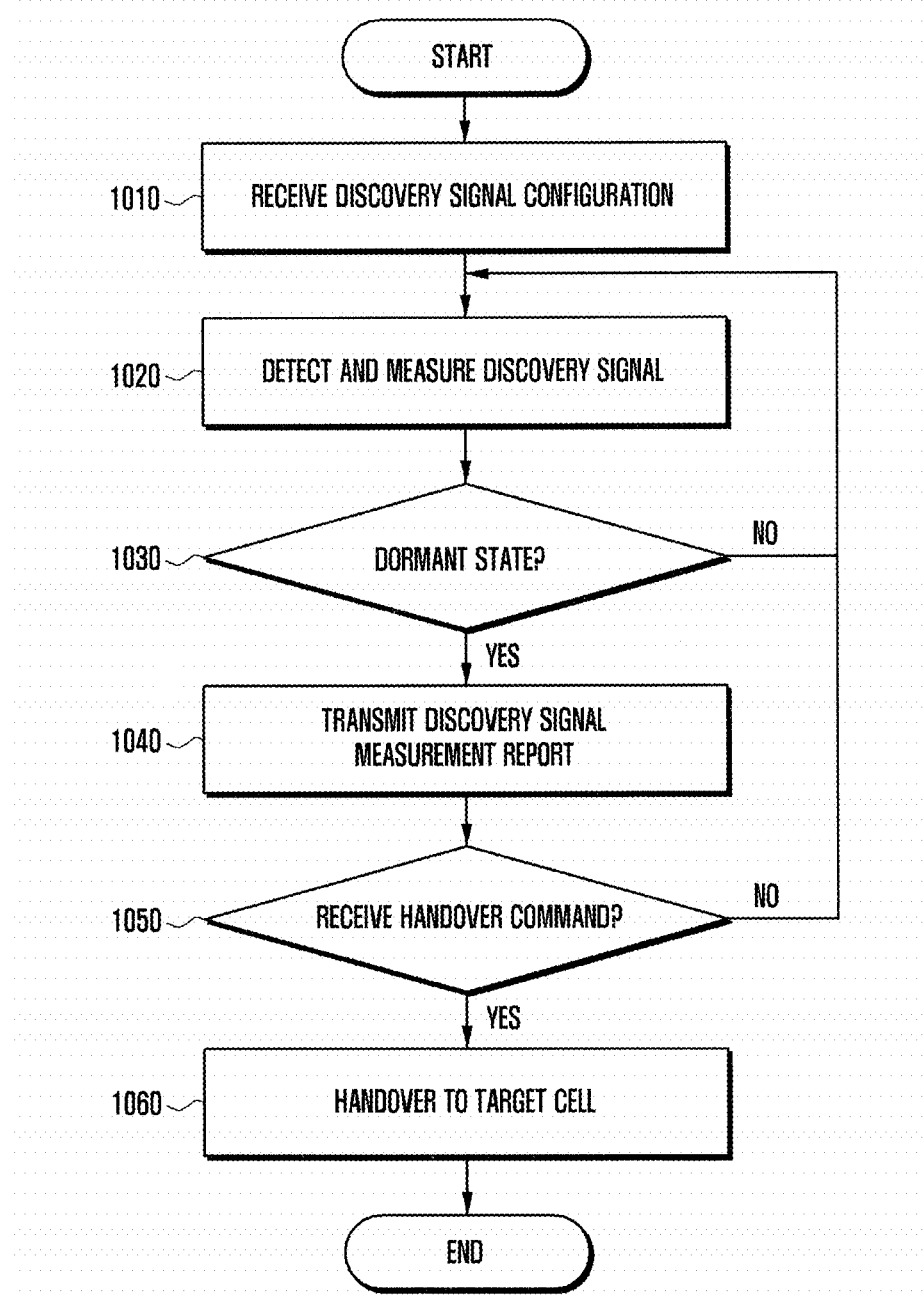
FIG. 10 is a flowchart illustrating a UE procedure according to an embodiment of the present disclosure.

FIG. 10 is a flowchart illustrating the UE procedure according to an embodiment of the present disclosure.

Particularly, FIG. 10 is directed to the UE operations in the fourth embodiment.

Referring to FIG. 10, the UE acquires the discovery signal configuration of the neighbor cell from the eNB at operation 1010. As described above, the discovery signal configuration may include the discovery signal transmission interval, transmission timing, bandwidth, resource mapping information, and sequence information; and the UE may receive the discovery signal configuration of one or more cells from the eNB.

The UE detects and measures the discovery signals based on the received discovery signal configurations of the neighbor cells at operation 1020. Afterward, at operation 1030, the UE determines whether the cell corresponding to the discovery signal detected at operation 1020 is in the dormant state. If it is determined that the cell is not in the dormant state at operation 1030, the UE returns the procedure to operation 1020. If it is determined that the cell is in the dormant state at operation 1030, the UE sends, at operation 1040, the eNB the measurement report about the discovery signal measured at operation 1020.

Afterward, the UE determines whether a handover command is received from the eNB at operation 1050. If no handover command is received, the UE returns the procedure to operation 1020 and, otherwise if the handover command is received, performs handover to the target cell indicated in the handover command at operation 1060.

The fourth and fifth embodiments may be described with reference to FIG. 10 along with the following modification. In the fourth embodiment, the UE determines whether the cell corresponding to the discovery signal detected at operation 1030 is in the active state such that, if the cell is in the active state, the procedure proceeds to operation 1040 and, otherwise, returns to operation 1020. In the fifth embodiment, the determination operation 1030 is omitted such that the cell state of the corresponding cell is included in the discovery signal measurement report of the UE at operation 1040.

Figure 11:
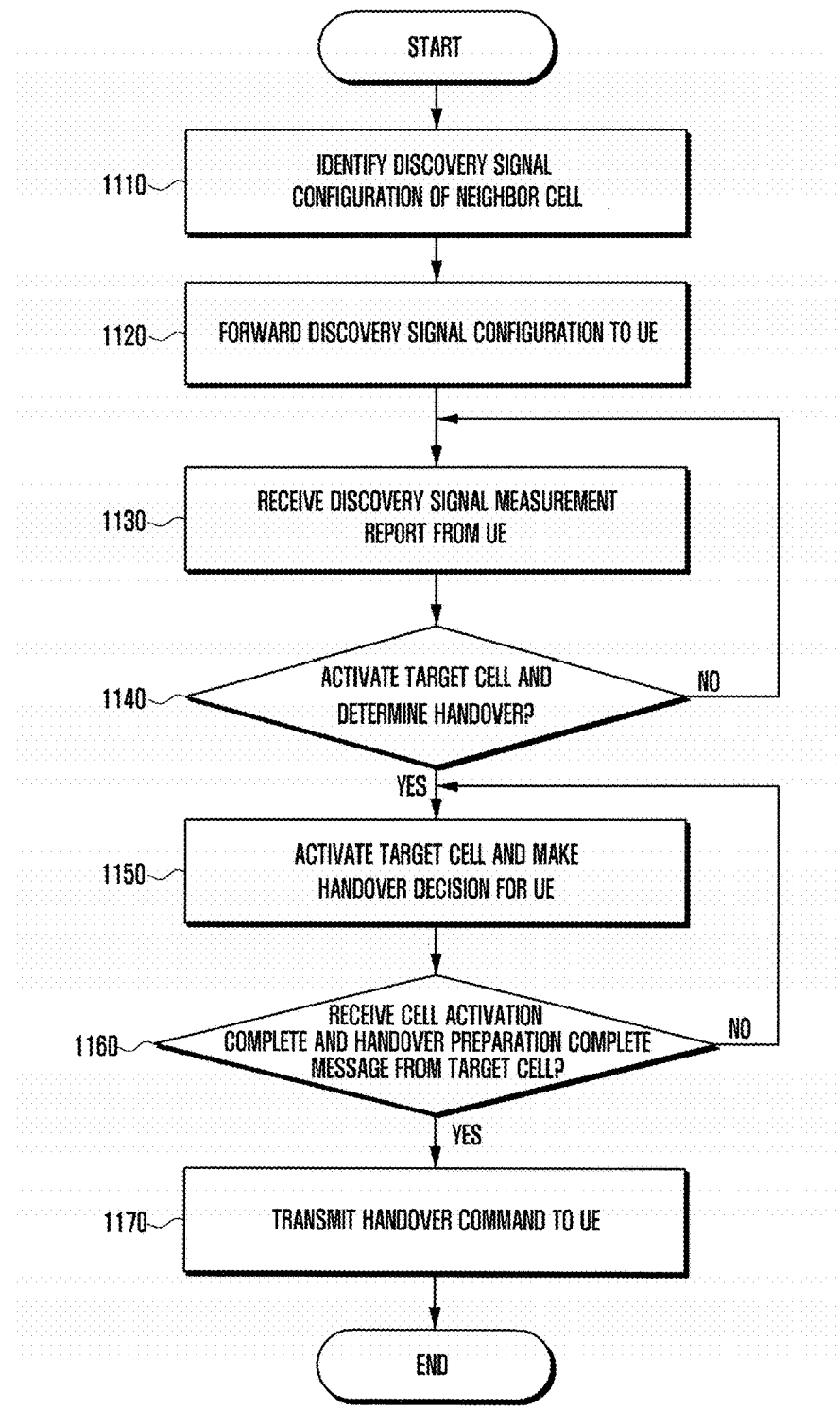
FIG. 11 is a flowchart illustrating an eNB procedure according to an embodiment of the present disclosure.

FIG. 11 is a flowchart illustrating the eNB procedure according to an embodiment of the present disclosure.

Particularly, FIG. 11 is directed to the UE operations in the fourth embodiment.

Referring to FIG. 11, the eNB acquires the discovery signal configuration of the neighbor cell from the neighbor cell at operation 1110 and forwards the discovery signal configuration of the neighbor cell to the UE at operation 1120. The discovery signal configuration may include the discovery signal transmission interval, transmission timing, bandwidth, resource mapping information, and sequence information; and the eNB may acquire the discovery signal configurations of one or more neighbor cells and forwards the acquired discovery signal configurations to the UE.

Afterward, the eNB receives the measurement report including cell IDs and received signal strengths on one or more discovery signals from the UE at operation 1130. In this case, in order to reduce unnecessary transmission overhead, the eNB may receive the measurement report on the discovery signals of which received signal strength is greater than a predetermined threshold value which may be included in the discovery signal configuration or may be a fixed value.

The eNB determines whether to activate the cells included in the measurement report and, if so, whether to make a handover decision for the UE to any activated cell at operation 1140. If it is determined to do not activate the cells at operation 1140, the eNB returns the procedure to operation 1130 to receive next measurement report from the UE. Otherwise, if it is determined to activate the cell and make a handover decision for the UE to any activated cell at operation 1140, the eNB requests the cell to transition to the activate state and prepare for handover of the UE at operation 1150.

If a cell activation complete and handover preparation complete message is received from the corresponding cell at operation 1160, the eNB commands the UE to make a handover to the corresponding cell at operation 1170 and, otherwise, if the cell activation complete and handover preparation complete message is not received, returns the procedure to operation 1150.

The eNB procedure in the fifth embodiment may follow the eNB procedure of FIG. 5, and the eNB procedure in the sixth embodiment may follow modification of the eNB procedure of FIGS. 5 and 11.

Seventh Embodiment

The seventh embodiment is directed to a method of mapping the discovery signal onto the time-frequency resource grid.

Figure 12:
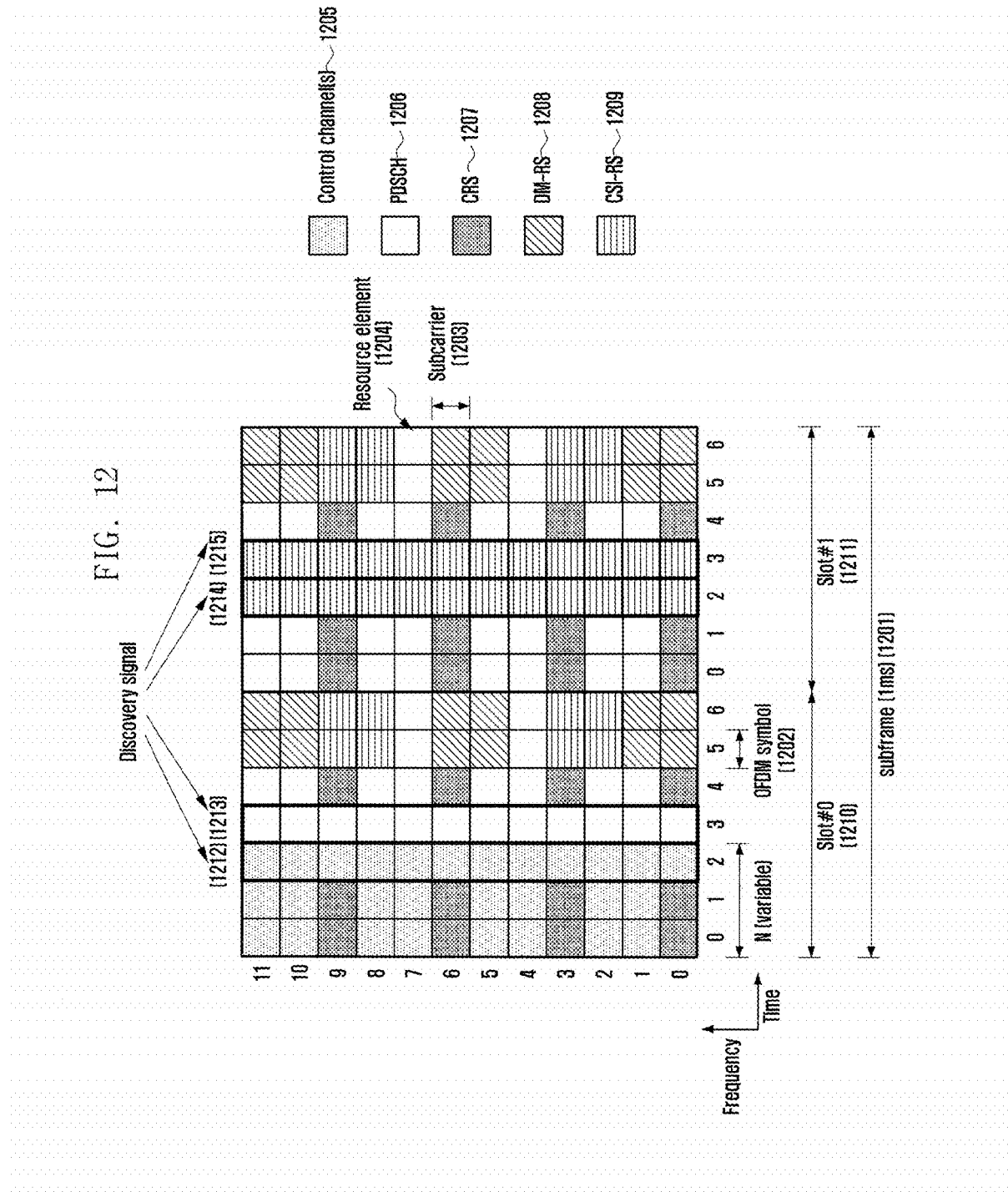
FIG. 12 is a diagram illustrating the discovery signal mapped onto a time-frequency resource grid according to an embodiment of the present disclosure.

FIG. 12 is a diagram illustrating the discovery signal mapped onto the time-frequency resource grid according to an embodiment of the present disclosure.

Referring to FIG. 12, the subframe mapping positions of the signals or control channels essential for the operation of the LTE/LTE-A system such as PSS/SSS, Physical Broadcasting Channel (PBCH), and paging are fixed. Accordingly, the discovery signal is mapped so as to be transmitted at subframes #1, #2, #3, #6, #7, and #8 in a Frequency Division Duplexing (FDD) mode and subframes #3, #4, #7, #8, and #9 in a Time Division Duplexing mode to avoid collision with the signals or control channels. The discovery signal is mapped to the positions without collision with Cell-specific Reference Signal (CRS), DeModulation Reference Signal (DM-RS), and CSI-RS in the subframe and where consecutive resource allocation is possible in the time or frequency domain. It is preferred to map the discovery signal to the time-frequency regions denoted by reference numbers 1212, 1213, 1214, and 1215 to fulfil the above conditions in consideration of the mapping relationship between the basic time-frequency resource structure of FIG. 1 and the downlink physical channel and signals. The frequency region may be expanded without collision with other signals if necessary. Among the resource positions denoted by reference numbers 1212, 1213, 1214, and 12125, the region 1213 of OFDM symbol#3 of slot#0 to which only the PDSCH is mapped is available to map the discovery signal thereto without collision with other signals. Since the eNB can adjust the resource mapping for PDSCH in its scheduling decision, it is possible to avoid the collision of the discovery signal at the position 1213 of the OFDM symbol#3 of slot#0. In the case that time domain mapping length of the downlink control channel is N={1, 2}, it is possible to map the discovery signal to the position 1212 of OFDM symbol#2 of slot#0. For example, since the subframe is restricted to N={1, 2}, it is possible to use the position 1212 of OFDM symbol#2 of slot#0 for transmitting the discovery signal. Although the position 1214 of OFDM symbol#2 of slot#1 and the position 1215 of OFDM symbol#3 of slot#1 are designated for CSI-RS mapping, the eNB may use these positions for transmitting the discovery signal by canceling the CSI-RS mapping thereto.

Figure 13:
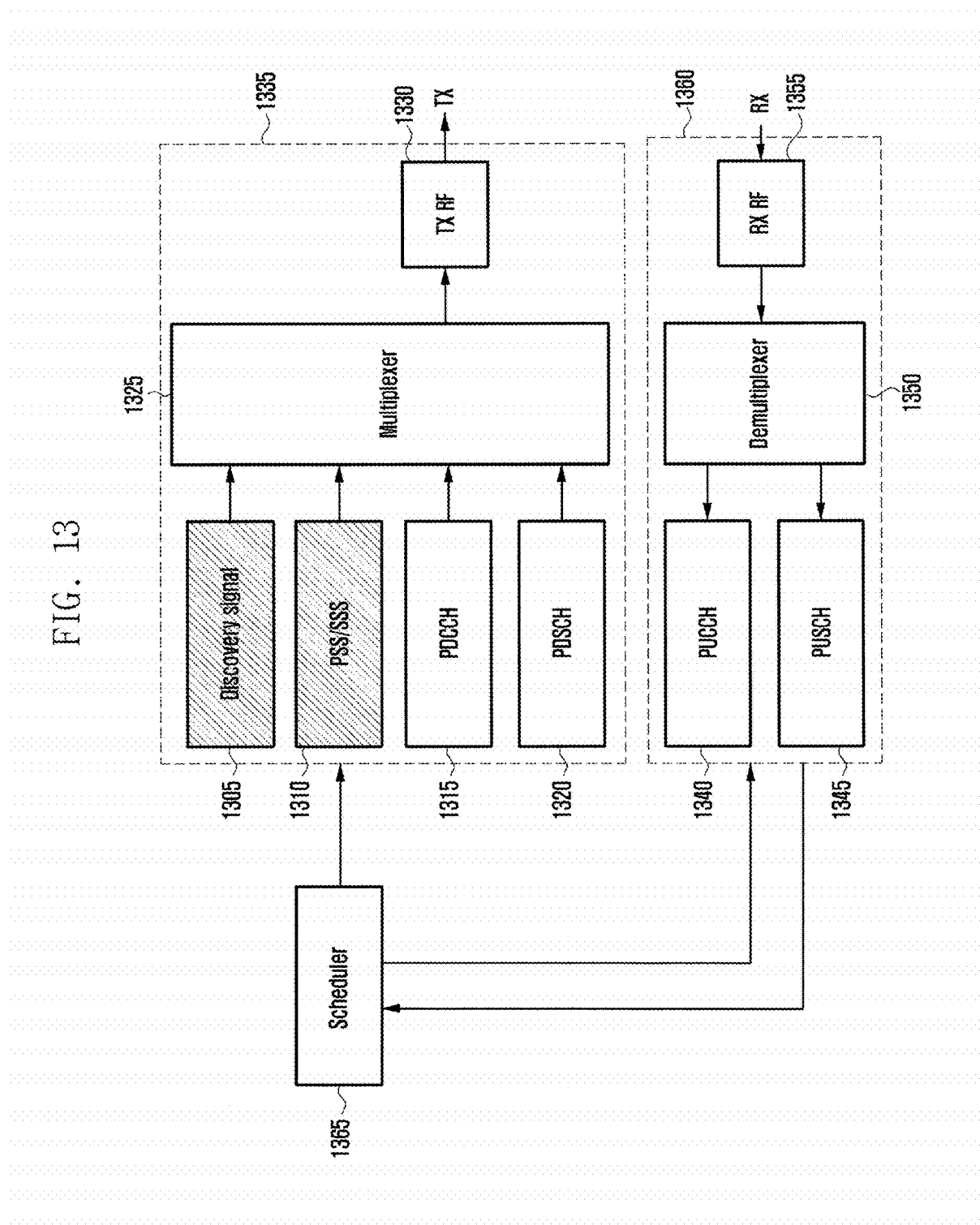
FIG. 13 is a block diagram illustrating a configuration of an eNB according to an embodiment of the present disclosure.

FIG. 13 is a block diagram illustrating a configuration of the eNB according to an embodiment of the present disclosure.

Referring to FIG. 13, the eNB 1300 comprises a transmitter 1335 including a discovery signal generator 1305, a PSS/SSS generator 1310, a Physical Downlink Control CHannel (PDCCH) generator 1315, a Physical Downlink Shared CHannel (PDSCH) generator 1320, a multiplexer 1325, and a Radio Frequency (RF) transmitter 1330. The eNB 1300 also comprises a receiver 1360 including a Physical Uplink Control CHannel PUCCH receiver 1340, a Physical Uplink Control CHannel PUSCH receiver 1345, a demultiplexer 1350, and an RF receiver 1355. The eNB 1300 also includes a scheduler 1365. In various embodiments, the transmitter 1335 and the receiver 1360 may be referred to as a transceiver, and the scheduler may be referred to as controller or processor.

The scheduler 1365 controls the function blocks of the transmitter 1335 and the receiver 1360 to generate and acquire predetermined signals and determines whether to control a cell to operate in the active or dormant state. If it is determined to operate the cell in the dormant state, the cell minimizes the signal transmission/reception operation. The discovery signal generator 1305 generates the discovery signal which is mapped to the time-frequency region determined under the control of the scheduler 1365. The PSS/SSS generator 1310 generates PSS/SSS under the control of the scheduler 1365. The PDCCH generator 1315 generates a PDCCH through a channel coding and modulation process on the downlink control information including scheduling information under the control of the scheduler 1365. The PDSCH generator 1320 generates a PDSCH through a channel coding and modulation process on the downlink data under the control of the scheduler 1365. The discovery signal generated by the discovery signal generator 1305, the PSS/SSS generated by the PSS/SSS generator 1310, the PDCCH generated by the PDCCH generator 1315, and the PDSCH generated by the PDSCH generator 1320 are multiplexed by the multiplexer 1325, mapped to the corresponding time-frequency region, and processed by the RF transmitter 1330 to be transmitted to the UE.

The receiver 1360 of the eNB demultiplexes the signal received from the UE by means of the demultiplexer 1350 and delivers the demultiplexed signal to the PUCCH receiver 1340 and PUSCH receiver 1345. The PUCCH receiver 1340 performs demodulation and channel decoding process on the PUCCH including Uplink Control Information (UCI) to acquire Hybrid Automatic Repeat reQuest (HARQ) ACKnowledge (ACK)/Non-ACKnowledge (NACK), Channel State Information (CSI), etc. The PUSCH receiver 2345 performs demodulation and channel decoding process on the PUSCH including uplink data to acquire the uplink data transmitted by the UE. The receiver 1360 of the eNB transfers the output results of the PUCCH receiver 1340 and the PUSCH receiver 1345 to the scheduler 1365 for use in scheduling process.

Figure 14:
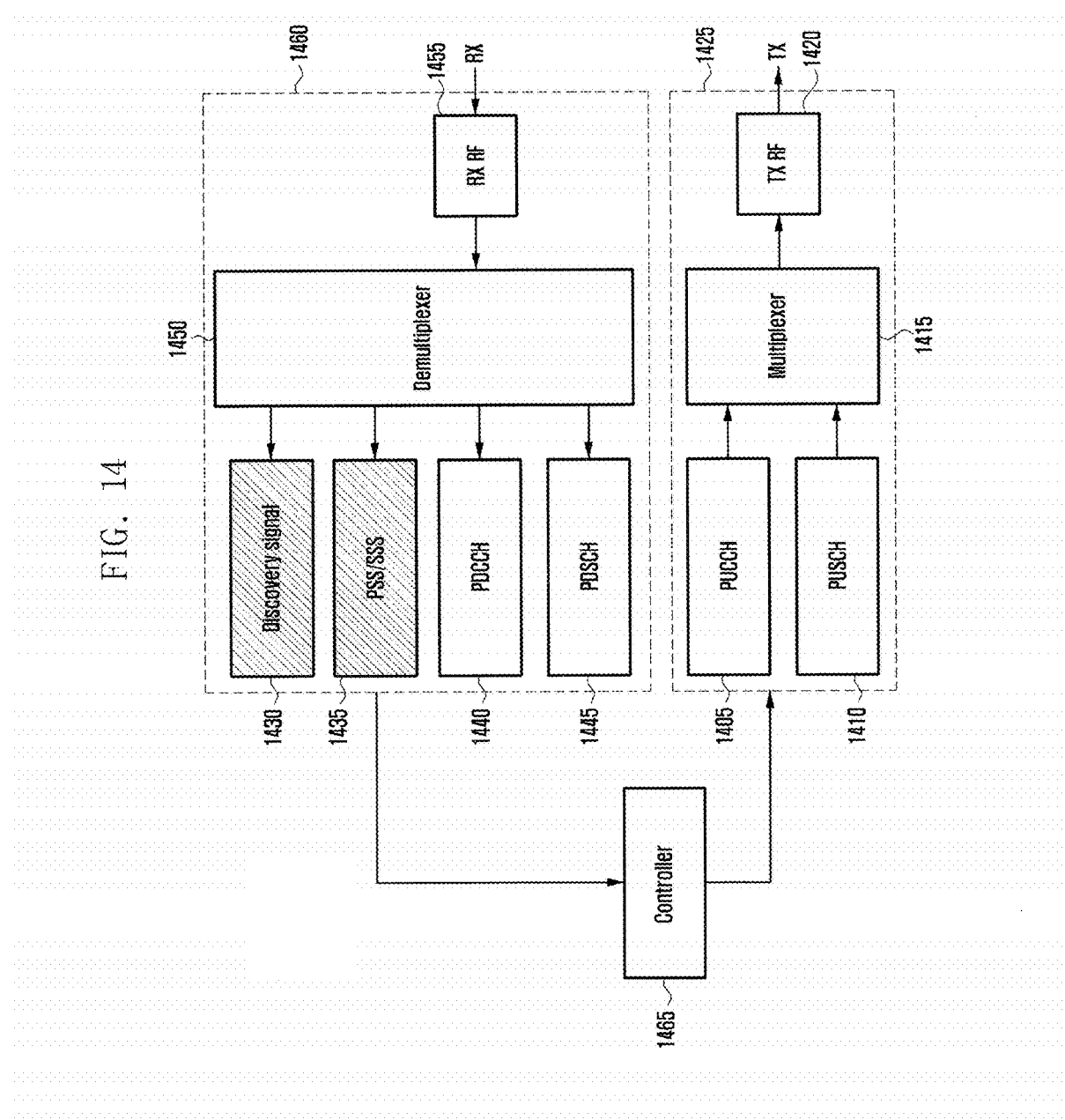
FIG. 14 is a block diagram illustrating a configuration of a UE according to an embodiment of the present disclosure.

FIG. 14 is a block diagram illustrating a configuration of the UE according to an embodiment of the present disclosure.

Referring to FIG. 14, the UE comprises a transmitter 1425 including a PUCCH generator 1405, a PUSCH generator 1410, a multiplexer 1415, and an RF transmitter 1420. The UE also comprises a receiver 1460 including a discovery signal receiver 1430, a PSS/SSS receiver 1435, a PDCCH receiver 1440, a PDSCH receiver 1445, a demultiplexer 1450, and an RF receiver 1455; and a controller 1465. The controller 1465 controls the UE to extract the discovery signal from the control information received from the eNB and controls the functions blocks of the receiver 1460 and the transmitter 1425. In various embodiments, the transmitter 1425 and the receiver 1460 may be referred to as transceiver.

The discovery signal receiver 1430 of the receiver 1460 performs discovery signal acquisition process at the predetermined time-frequency region. The PSS/SSS receiver 1435 performs PSS/SSS acquisition process at the predetermined time-frequency region. The PDCCH receiver 1440 performs demodulation and channel decoding process on the received PDCCH to acquire downlink control information. The PDSCH receiver 1445 performs demodulation and channel decoding process on the PDSCH to acquire downlink data.

The PUCCH generator 1405 of the transmitter 1425 performs channel coding and modulation process on the UCI including HARQ ACK/NACK and CSI to generate PUCCH. The PUSCH generator 1410 performs channel coding and modulation process on the uplink data to generate PUSCH.

The PUCCH generated by the PUCCH generator 1405 and the PUSCH generated by the PUSCH generator 1410 are multiplexed by the multiplexer 1415 and processed by the RF transmitter 1420 to be transmitted to the eNB.

The discovery signal transmission/reception method of the present disclosure is capable of improving energy efficiency of a mobile communication system.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the various embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

While the present disclosure has been shown and described with reference to various embodiments thereof, it will be understood by those skilled in the art that various changes in form and details maybe made therein without departing from the spirit and scope of the present disclosure as defined by the appended claims and their equivalents.

What is claimed is:

1. A method of a base station in a mobile communication system, comprising:
    receiving, from a user equipment (UE), a measurement report on a discovery signal of a neighbor cell;
    determining whether the neighbor cell is in a dormant state and a received signal strength of the discovery signal of the neighbor cell is greater than a predetermined threshold value based on the measurement report; and
    determining to activate the neighbor cell in the dormant state in response to determining that the received signal strength of the neighboring cell in the dormant state is greater than the predetermined threshold value.

2. The method of claim 1, wherein the measurement report includes at least one of a cell identifier (ID) of the neighbor cell, the received signal strength of the discovery signal, or a cell state of the neighbor cell.

3. The method of claim 1, wherein the measurement report is transmitted if the neighbor cell is in the dormant state.

4. The method of claim 1, wherein the measurement report is transmitted if the received signal strength of the discovery signal is greater than the predetermined threshold value.

5. The method of claim 1, further comprising:
if the neighbor cell is determined to be activated, determining whether to handover the UE to the neighbor cell.

6. The method of claim 1, further comprising:
identifying a configuration of the discovery signal; and
transmitting, to the UE, the configuration of the discovery signal.

7. The method of claim 6, wherein the configuration of the discovery signal includes information on a transmission period and a timing offset of the discovery signal.

8. A base station in a mobile communication system, comprising:
a transceiver configured to transmit and receive signals to and from a user equipment (UE); and
a controller configured to:
control the transceiver to receive, from the UE, a measurement report on a discovery signal of a neighbor cell,
determine whether the neighbor cell is in a dormant state and a received signal strength of the discovery signal of the neighbor cell is greater than a predetermined threshold value based on the measurement report, and
determine to activate the neighbor cell in the dormant state in response to determining that the received signal strength is greater than the predetermined threshold value.

9. The base station of claim 8, wherein the measurement report includes at least one of a cell identifier (ID) of the neighbor cell, the received signal strength of the discovery signal, or a cell state of the neighbor cell.

10. The base station of claim 8, wherein the measurement report is transmitted if the neighbor cell is in the dormant state.

11. The base station of claim 8, wherein the measurement report is transmitted if the received signal strength of the discovery signal is greater than the predetermined threshold value.

12. The base station of claim 8, wherein the controller is further configured to:
if the neighbor cell is determined to be activated, determine whether to handover the UE to the neighbor cell.

13. The base station of claim 8, wherein the controller is further configured to:
identify a configuration of the discovery signal, and
control the transceiver to transmit, to the UE, the configuration of the discovery signal.

14. The base station of claim 13, wherein the configuration of the discovery signal includes information on a transmission period and a timing offset of the discovery signal.

15. A method of a user equipment (UE) in a mobile communication system, the method comprising:
receiving, from a base station, a discovery signal configuration of a neighbor cell;
measuring a discovery signal that is transmitted from the neighbor cell according to the discovery signal configuration; and
transmitting, to the base station, a measurement report on the discovery signal of the neighbor cell, the measurement report including at least one of a cell identifier (ID) of the neighbor cell, a received signal strength of the discovery signal, or a cell state of the neighbor cell,
wherein the neighbor cell in a dormant state is activated in response to determining that the received signal strength of the neighboring cell in the dormant state is greater than a predetermined threshold value.

16. The method of claim 15, wherein the measurement report is transmitted if the neighbor cell is in the dormant state.

17. The method of claim 15, wherein the measurement report is transmitted if the received signal strength of the discovery signal is greater than the predetermined threshold value.

18. The method of claim 15, wherein the discovery signal configuration includes information on a transmission period of the discovery signal and a timing offset of the discovery signal.

19. A user equipment (UE) in a mobile communication system, comprising:
a transceiver configured to transmit and receive signals to and from a base station; and
a controller configured to:
control the transceiver to receive, from the base station, a discovery signal configuration of a neighbor cell,
measure a discovery signal that is transmitted from the neighbor cell according to the discovery signal configuration, and
control the transceiver to transmit, to the base station, a measurement report on the discovery signal of the neighbor cell, the measurement report including at least one of a cell identifier (ID) of the neighbor cell, a received signal strength of the discovery signal, or a cell state of the neighbor cell,
wherein the neighbor cell in a dormant state is activated in response determining that the received signal strength of the neighboring cell in the dormant state is greater than a predetermined threshold value.

20. The UE of claim 19, wherein the measurement report is transmitted if the neighbor cell is in the dormant state.

21. The UE of claim 19, wherein the measurement report is transmitted if the received signal strength of the discovery signal is greater than the predetermined threshold value.

22. The UE of claim 19, wherein the discovery signal configuration includes information on a transmission period of the discovery signal and a timing offset of the discovery signal.

* * * * *